Figure 1:
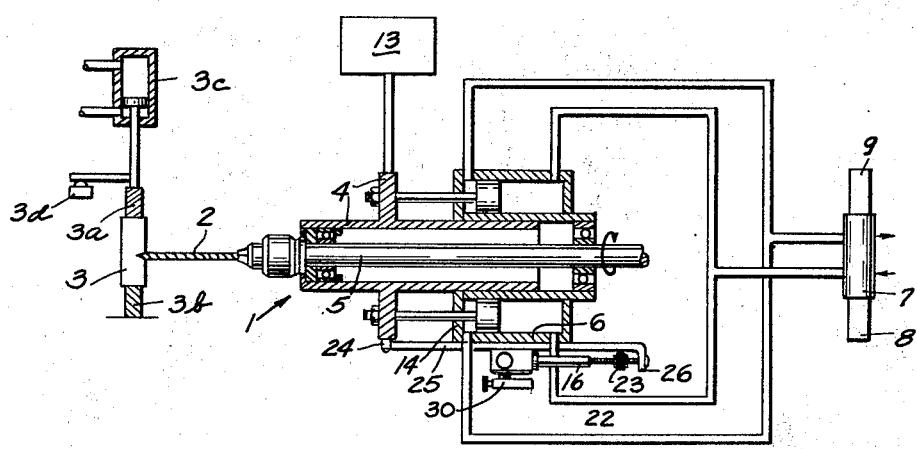

Oct. 4, 1960     A. V. KLANCNIK     2,954,851
DASHPOT FOR MACHINE TOOLS

Filed Aug. 25, 1958     2 Sheets-Sheet 1

INVENTOR.
ADOLPH V. KLANCNIK
BY
Wallace and Cannon
ATTYS.

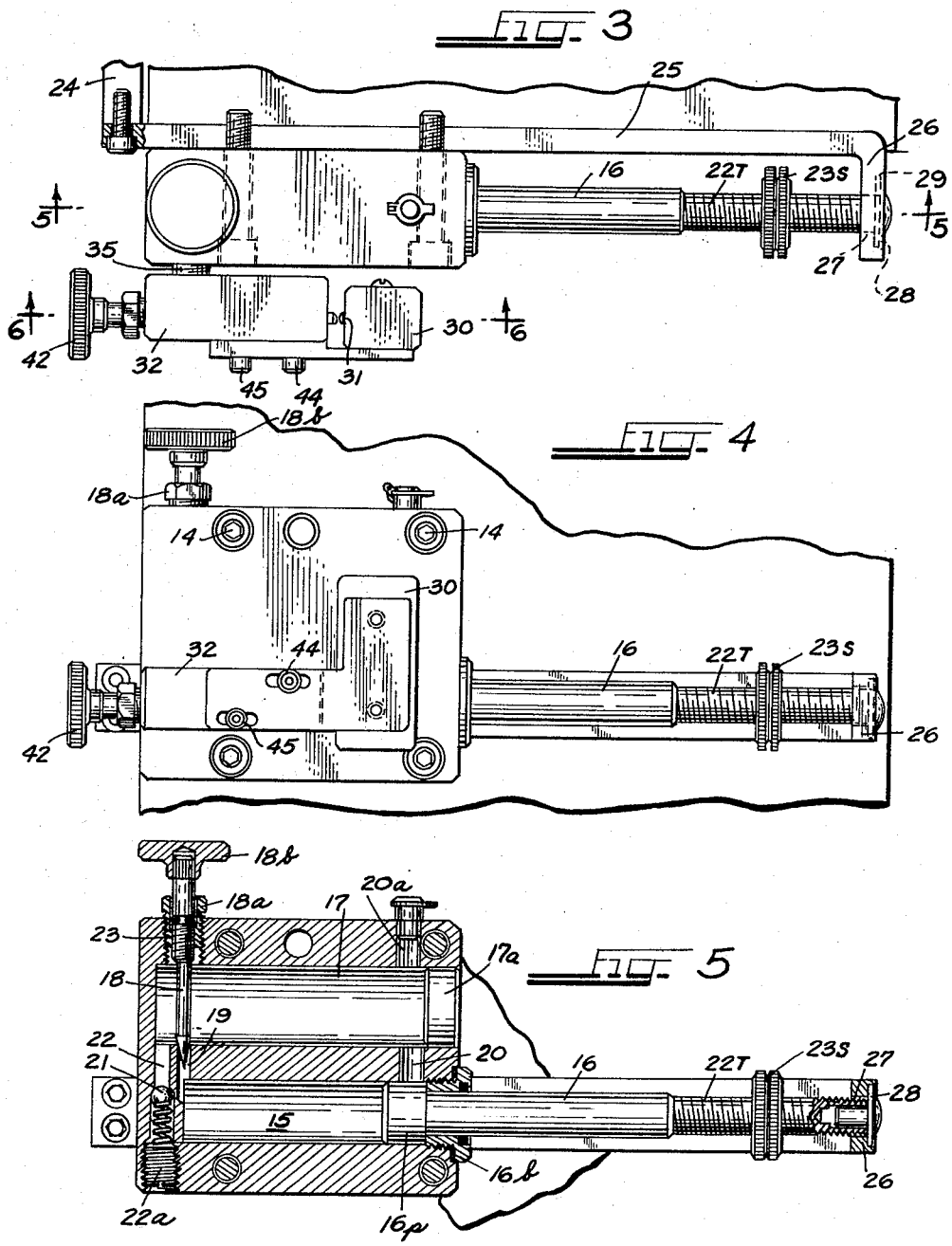

United States Patent Office 2,954,851
Patented Oct. 4, 1960

2,954,851
DASHPOT FOR MACHINE TOOLS
Adolph V. Klancnik, Glenview, Ill.
Filed Aug. 25, 1958, Ser. No. 756,941
1 Claim. (Cl. 188—97)

This invention relates to a control for automatic machine tools wherein a tool is mounted for reciprocating automatically controlled strokes toward and away from a work piece incidental to tapping, broaching, reaming or like operations performed on the work piece.

One of the more common forms of machine tools is one wherein a drill or like rapidly rotating tool is mounted for rotation at the end of a piston which is mounted in a cylinder for forward and reverse strokes relative to the work piece being operated upon by the tool. Thus, when the work piece is to be subjected to the function of the tool the chuck in which the tool is gripped is set in rotary motion, and the piston which carries the chuck is subjected to its forward stroke causing the tool to engage the work piece. It may be that an opening or recess is being drilled, an opening is being counter-sunk, an end is being rounded off or chamfered, and so on, and in many of these operations it is desirable that there be a slight dwell of the rotating tool at the bottom of its stroke, say for ten revolutions or so, either to account for accurate depth control over a drilled opening or final smoothing of the surfaces that were operated on by the tool. One of the primary objects of the present invention is to enable such dwell of the rotating tool to be controlled in a relatively simple, inexpensive and efficient manner, and to be able to establish a great deal of accuracy in the amount of dwell.

It is also common practice in this art to associate a dash pot with the piston which carries the rotating tool for various different purposes, but for the most part such dash pot control accounts for increasing resistance to the forward stroke of the piston just prior to and during the time that the drill or other tool is engaging the work piece while performing the essential machining operation. For example, it is common to utilize dash pot resistance at a time just prior to the drill breaking through the far side of the work piece, and also to exert dash pot resistance on the drill at the moment it engages the work piece. Moreover, it is advantageous to cut out the dash pot or at least to account for a release of its resistance during the time that the piston is on its reverse or back stroke, since this greatly speeds up operation of the machine. Another object of the present invention is to construct a relatively simple and inexpensive dash pot for use in machine tools, and to associate with this dash pot the depth control or dwell control device referred to above.

Other and further objects of the present invention will be apparent from the following description and claim and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claim.

Figure 2:
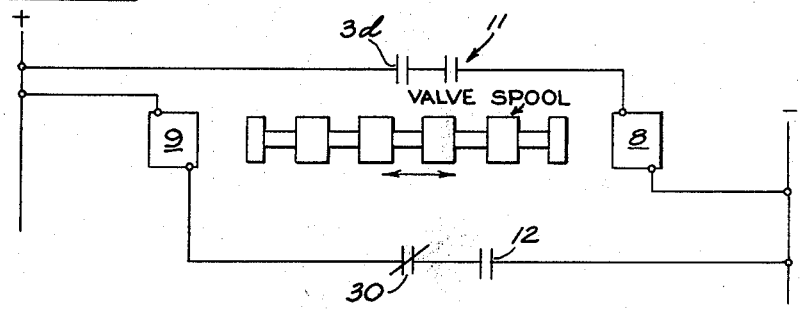
Figure 6:
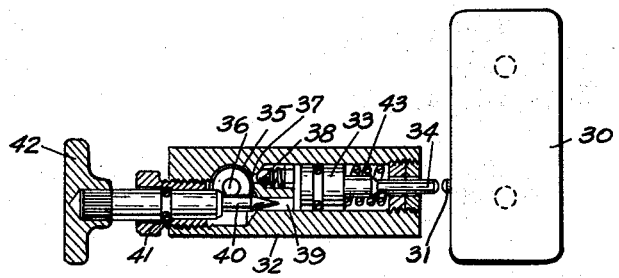

In the drawings:
Fig. 1 is a schematic view of a reciprocatory machine tool equipped with the present invention;
Fig. 2 is a schematic diagram of a tool control circuit used in the invention;
Fig. 3 is a detailed plan view of a portion of the system illustrated in Figure 1;
Fig. 4 is a side elevation of the assembly illustrated in Fig. 3;
Fig. 5 is a sectional view of the assembly illustrated in Fig. 3 taken on section lines 5—5 of Fig. 3; and
Fig. 6 is a detailed sectional view of a switch actuating mechanism utilized in the present invention and taken substantially on the section lines 6—6 of Fig. 3.

With particular reference now to the drawings and in the first instance to Fig. 1, there is generally designated at 1 a reciprocating machine tool which may be a drill, reamer, broaching tool or the like. The cutting tool 2 thereof is adapted to be advanced toward and away from a work piece 3 by means of a so-called platen 4 having a spindle 5 rotatably mounted therein. Any suitable power means, not shown, may be provided to rotate the tool-carrying spindle. Tools of this type are customarily provided with some power means for advancing the tool toward the work piece and retracting it therefrom and in the embodiment of the invention illustrated in the drawings this means is shown as a pair of fluid cylinders 6 having the pistons thereof connected to the platen 4. Fluid, which may be air, is selectively admitted to one end or the other of the cylinder means 6 under control of a suitable 4-way valve 7. The valve may utilize a first solenoid 8 for shifting the valve spool to one limit to admit fluid to the upper ends of the cylinders illustrated, thereby causing advance movement of the tool. A second solenoid 9 may, when energized, shift the valve spool in the opposite direction so as to admit fluid to the other end of the cylinders 6 for causing retracting movement of the tool 2.

Machine tools of this character usually include an automatic work holding mechanism in the form of relatively movable jaws diagrammatically represented at 3a and 3b. A fluid cylinder 3c is adapted to move one jaw 3a toward the other to grip the work piece therebetween. A switch 3d, Fig. 2, is in the circuit to the advancing solenoid 8 and is closed when the work piece is firmly held by the jaws, thus conditioning the advancing solenoid circuit for operation. Systems of this character may also include a manual on-and-off switch (not shown) in the circuit to the solenoids and tool reversing switches 11 and 12, which as shown in Fig. 2 are in circuit with the solenoids 8 and 9, respectively. One switch 12 may be actuated when the tool reaches a predetermined point in its travel as, for example, that point in the movement of the tool corresponding to the maximum penetration of the tool in the work piece. The switch 12 is closed, at that time, thus energizing the solenoid 9 to shift the valve and cause return movement of the tool. The switch 11, on the other hand, will only be closed for energizing the solenoid 8 when the tool is at the opposite or retracted position of movement, thus automatically reversing the tool. A switch actuating mechanism, diagrammatically represented at 13 in Fig. 1 is interconnected with the tool carrying platen 4 in such a manner that switch 12 is closed at the end of the advancing stroke while switch 11 is opened, while at the end of the retracting stroke switch 11 is closed while switch 12 is opened. Machine tool systems of this character are designed for automatic, continuously reciprocating operation.

These hole forming tools are usually provided with some form of dash pot control device which retards movement of the tool at some preselected stage of operation near the end of its work performing stroke so as to avoid a breakthrough. In accordance with the invention, a dash pot 14 is mounted on the main cylinder block of the machine tool. The dash pot includes a cylinder 15 formed therein, and a plunger 16 having a piston head 16P adapted for reciprocal axial movement in the cylinder 15. The dash pot includes a reservoir 17, the axis of which is parallel to the axis of the cylinder 15 and which contains a suitable hydraulic fluid.

Both the cylinder space and reservoir space in the dash pot may be cast with the block or they may be formed from drilling. A plug 17a closes one end of the reservoir.

A needle valve 18 is adapted for adjustably restricting flow of fluid from one end of the dash pot cylinder through a passage 19 so that during movement of the plunger 16 to the left, as illustrated in Fig. 5, fluid will be forced from the cylinder 15 through the restricted passage 19 and into the reservoir. Thus, the restriction for the escape of the fluid retards movement of the plunger toward the left. The other or right-hand end of the cylinder 15 communicates through a drain passage 20 with the reservoir so that upon movement of the plunger to the right fluid is forced through the passage 20 without restriction and into the reservoir. The drain port may be drilled through the wall between the cylinder and reservoir at the same time that an aligned filling opening 20a is formed.

A spring-biased check valve 21 is provided in a passage 22 which establishes communication between the reservoir and the needle valve end of the dash pot cylinder, so that upon return movement of the plunger 16 fluid readily flows through the passage 22 and into the dash pot chamber or cylinder. The check valve prevents opposite flow of fluid from the cylinder to the reservoir. A plug 22a closes the bore leading to the check valve passage, and the needle valve 18 is advantageously threadably mounted in a nut plug 23 in turn threadedly mounted in the dash pot housing, so that by turning the head 18b of the needle valve, the point of this valve is moved toward and away from the passage 19 so as to vary the size of the restricted opening and thus vary the retarding resistance offered to the flow of hydraulic fluid from the dash pot chamber.

The plunger 16 is supported for sliding movement in a bearing 16b in the dash pot and extends outwardly from the dash pot housing. The end of the plunger opposite the piston part 16p is threaded as at 22T and carries adjustable stops 23S in threaded engagement with the portion 22T. In order to cause movement of the plunger within the cylinder and toward the left and thus retard movement of the tool during its advancing stroke, a spider 24 (see Fig. 1) may be fixed to the tool carrying platen. An arm 25 is fixed to the spider 24 and includes an off-set portion 26, Fig. 3, at one end thereof which is adapted for abutting engagement with the stops 23S at a predetermined point of the movement of the tool. As the tool advances in its work performing operation, the arm 25 may move to the left as seen in Fig. 3 and engage the stops 23S near the end of its work performing stroke and force the piston 16p to the left in the cylinder 15. Thus the plunger and dash pot retard the final movement of the tool. By threadably adjusting the position of the stops 23S on the plunger, the point in the travel of the tool at which the dash pot is actuated may be selectively varied in accordance with the desired length of the work performing stroke of the tool and in accordance with the amount of movement desired to be retarded.

The off-set portion 26 of the arm 25 has a bore 27 through which the outer end of the plunger 16 is received. The plunger preferably carries a washer 28 at its extreme outer end which is adapted to seat in a recess 29 in the end of the off-set portion 26. Thus, after the arm 25 has moved to the left during the work performing stroke of the tool and caused inward movement of the dash pot plunger and then moves to the right during the retracting stroke of the tool the surface of the recess 29 will engage the washer 28 and force the plunger of the dash pot to the right, thus setting up the plunger for the next work performing stroke of the tool.

Pressure responsive means are provided for de-energizing the circuit controlling the solenoid 9 which during energization thereof actuates the valve 7 to cause retracting movement of the tool. Thus, a normally closed micro switch 30 is mounted on one side of the dash pot housing and includes an actuating member 31 which when depressed opens the switch. The switch 30 is in the wiring leading to the solenoid 9. When the switch 30 is open, the circuit to the solenoid controlling the retracting movement of the tool is deactivated.

Means are provided for opening the switch 30 and holding it open for a period of time corresponding to the desired period of dwell time of the tool in the work piece. To this end, an auxiliary cylinder 32 is mounted on the dash pot housing and includes a piston 33 therein, Fig. 6, having a rod 34 extending outwardly from the cylinder and positioned for contact with the actuating member 31 of the switch 30 so that during movement of the piston as to the right in Fig. 6, the switch 30 is opened. A pressure equalizing conduit 35, Fig. 3, leads from the dash pot cylinder to the auxiliary cylinder 32 and has a passageway 36 therein which admits fluid to the auxiliary cylinder 32 at a pressure corresponding to the pressure in the dash pot cylinder. Fluid from the passage 36 flows through a passage 37 into the cylinder space in which the piston 33 operates so as to subject the piston 33 to the pressure in the dash pot cylinder. A spring-biased check valve 38 interposed in the passage 37 allows free entry of the fluid from the passage 36 into the working area of the cylinder in which piston 33 is disposed, but prevents its return through the passage 37. A fluid return from the working space is provided through a return port 39 communicating at respective ends with passage 36 and the cylinder space and which is restricted by an adjustable needle valve 40. The needle valve 40 is threadably mounted in a bearing support 41 so that the operator, by turning the handle 42 of the needle valve, may adjust the restricting effect on the passage 39. Thus when the dash pot plunger 16 is caused to move inwardly in the dash pot cylinder, as when the tool nears the end of its work performing stroke, the pressure in the dash pot cylinder will build up due to the restricting effect of the needle valve 18 and the same pressure will be developed in the working area of the cylinder 32 through the passage 37. This build up in pressure forces the piston 33 to the right as viewed in Fig. 6 and thus opens the switch 30 and deactivates the circuit leading to the tool retracting solenoid. When the tool reaches its final advanced position within the work, the switch 12 is closed, but the circuit to the solenoid 9 is open by reason of the opening of the switch 30. At this point in the travel of the machine tool, the other solenoid 8 is also de-energized. The plunger 16 also stops and the pressure in the dash pot cylinder quickly diminishes due to the fluid which escapes past the needle valve 18 into the reservoir. The pressure in the auxiliary cylinder 32, however, diminishes at a slower rate due to the fact that a drop in pressure in the dash pot cylinder will not cause flow of fluid in a return direction past the check valve 38. The pressure in the working area of the cylinder 32 diminishes slowly due to the restricting effect of the needle valve 40. When the pressure in the cylinder 32 has diminished to a predetermined point, a pre-set return spring 43, Fig. 6, for the piston 33 mounted on the non-pressure side thereof, will have sufficient force to move the piston 33 out of actuating contact with the switch member 31. Switch 30 then closes, and since switch 12 is closed at that time, solenoid 9 is then energized and the tool is retracted.

Thus the switch 30 will be opened upon a build up of pressure in the dash pot chamber and will be held open for a period of time after movement of the dash pot plunger stops. This period of time may be adjusted by adjusting the needle valve 40 so as to vary the restricting effect in the passage 39. Thus the tool will dwell at the end of its work performing stroke for a period of time selected by the operator and adjusted through adjustment of the needle valve 40.

In order to eliminate the circuit opening function of switch 30 in the event that the operator does not desire use of the pressure responsive dwell switch, the switch 30 may be adjustably mounted on the dash pot housing as by means of bolts 44 and 45 which are received through slots in a mounting plate for the switch and received by the dash pot housing. Thus the switch actuating member may be adjusted with the switch to a position wherein it will not be contacted by the piston rod 34 of the auxiliary cylinders. In this position the switch remains closed during the operation of the switch and allows complete control of the tool through the other switches of the tool control circuitry.

The retarding and dwell time system of the present invention is extremely compact and simple and may be applied to existing reciprocatory machine tool systems. It is positive in action and its dependency on the pressure developed by the dash pot cylinder eliminates the need for complicated dwell time control circuitry which in many instances are quite complex, overly sensitive to malfunctioning, and oppresively expensive. Hence, while I have illustrated and described a preferred embodiment of my invention it is to be understood that this is capable of variation and modification, and I therefore do not wish to be limited to the precise details set forth, but desire to avail myself of such changes and alterations as fall within the purview of the following claim.

I claim:

A dash pot for use in retarding movement of a reciprocable tool at a preselected stage of operation of the tool and comprising a housing having two parallel extending cylindrical bores formed therein, one of which bores is adapted to act as a reservoir and the other of which bores forms a cylinder, the section of the housing disposed intermediate the bores having a first conduit interconnecting adjacent ends of the reservoir bore and cylinder bore, a metering valve threadedly mounted in one wall of the housing and projecting within one end of the first conduit to form a variable area and continuously open metering orifice therewith, said section of the housing having a second conduit extending parallel and closely adjacent to the first conduit, said second conduit having a first opening in said reservoir bore and a second opening communicating with the end of the first conduit opposite the metering orifice, a ball check valve disposed within the second conduit and spring biased to a position wherein fluid flow from said first conduit through the second conduit to the reservoir bore is effectively prevented but fluid flow from said reservoir through the second conduit to said first conduit is permitted, said section of the housing having a third unrestricted conduit interconnecting the ends of the reservoir bore and the cylinder bore opposite the ends interconnected by the first conduit, said housing having a filling passage formed in the wall of a housing and aligned with said third conduit, a plunger piston slidably disposed within the cylinder bore between the first and third conduits whereby the rate of movement of said piston inwardly of the bore is regulated by the position of said valve within the orifice and movement of said piston outwardly of the bore displaces fluid rearwardly of the piston through the third conduit and induces fluid from the reservoir through the second conduit and past the spring biased check valve to the piston bore to provide rapid outward movement of the piston, said plunger piston having adjustable stop means for providing a variable lost motion connection with a piston actuating member affixed to the tool to be retarded.

References Cited in the file of this patent

UNITED STATES PATENTS

| | | |
|---|---|---|
| 1,595,171 | Shonnard | Aug. 10, 1926 |
| 2,243,580 | Rosch | May 27, 1941 |
| 2,346,359 | Claus | Apr. 11, 1944 |
| 2,354,889 | Smith | Aug. 1, 1944 |
| 2,367,799 | Robinson | Jan. 23, 1945 |
| 2,580,751 | Fletcher | Jan. 1, 1952 |
| 2,723,007 | Lanphere | Nov. 8, 1955 |
| 2,730,201 | Melzer | Jan. 10, 1956 |
| 2,780,116 | Schafer | Feb. 5, 1957 |

FOREIGN PATENTS

| | | |
|---|---|---|
| 590,291 | France | Mar. 13, 1925 |